United States Patent
Ogrinz (10) Patent No.: US 9,740,760 B2
(45) Date of Patent: Aug. 22, 2017

(54) METHOD FOR TRACKING DIFFERENCES BETWEEN PRODUCTION AND DEVELOPMENT DATABASES TO PERFORM AN AUTOMATIC SYNCHRONIZATION

(71) Applicant: BANK OF AMERICA CORPORATION, Charlotte, NC (US)

(72) Inventor: Michael Emil Ogrinz, Easton, CT (US)

(73) Assignee: Bank of America Corporation, Charlotte, NC (US)

( * ) Notice: Subject to any disclaimer, the term of this patent is extended or adjusted under 35 U.S.C. 154(b) by 485 days.

(21) Appl. No.: 14/250,442

(22) Filed: Apr. 11, 2014

(65) Prior Publication Data

US 2015/0293952 A1 Oct. 15, 2015

(51) Int. Cl.
*G06F 17/00* (2006.01)
*G06F 17/30* (2006.01)

(52) U.S. Cl.
CPC .. *G06F 17/30575* (2013.01); *G06F 17/30286* (2013.01)

(58) Field of Classification Search
CPC ........... G06F 11/3684; G06F 17/30424; G06F 17/30592
See application file for complete search history.

(56) References Cited

U.S. PATENT DOCUMENTS

| 2011/0082862 A1* | 4/2011 | Walsh | G06F 17/30286 707/737 |
| 2011/0093436 A1* | 4/2011 | Zha | G06F 17/30592 707/639 |
| 2014/0282606 A1* | 9/2014 | Clark | G06F 9/461 718/108 |

* cited by examiner

Primary Examiner — Mariela Reyes
Assistant Examiner — Courtney Harmon
(74) *Attorney, Agent, or Firm* — Michael A. Springs; Moore & Van Allen PLLC; Peter B. Stewart

(57) ABSTRACT

Embodiments disclosed herein relate to systems, methods, and computer program products for updating a development database. In some embodiments, the system and method compare a development database and an associated production database to determine a drift score. The development database is then updated when the drift score exceeds a predetermined threshold. In some situations, the system extracts a schema from the development database and the associated production database in order to identify differences between the two databases. The system then calculates a drift score based on the differences and compares the drift score to a predetermined threshold value. If the drift score exceeds the threshold value, the system alerts the user to update the development database or automatically updates the development database.

17 Claims, 3 Drawing Sheets

METHOD FOR TRACKING DIFFERENCES BETWEEN PRODUCTION AND DEVELOPMENT DATABASES TO PERFORM AN AUTOMATIC SYNCHRONIZATION

BACKGROUND

Application developers typically test new code before putting the code into use in a production database. The application developers usually test the new code in a development database, which is a test environment that mirrors the production database but does not affect customer data in the production environment.

Unfortunately, differences accumulate between the production environment and the development environment due to use of the production environment. For example, additional customers may be added to a database in new rows or additional information be recorded in a new column in a database. These differences may cause issues, such as execution issue for the application, when the application that was tested in the development database is implemented in the production database.

Users attempt to update the development database but this ad hoc process is not ideal. The users may set up a regular update schedule but doing so wastes resources and time when updating is not necessary. The user may also wait until an issue occurs when implementing the application in the production database but this also causes delayed time and frustration for the user when an update was beneficial but not performed and revisions are required for the application.

Thus, there is a need for a system and method that can assist users in updating development databases to reduce the likelihood that implementation of an application in a production database will encounter issues.

BRIEF SUMMARY

The following presents a simplified summary of one or more embodiments of the disclosure in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments disclosed herein address the above needs and/or achieve other advantages by providing an apparatus (e.g., a system, computer program product, and/or other device) and a computer-implemented method for updating a development database. In some embodiments, the system identifies a development database that serves as a test environment for one or more applications and identifies production databases associated with the development database. Differences accumulate between the development database and the associated production database over time and these differences can cause issues with the applications that are tested in the development database but implemented in the production database. For this reason, users desire the development database to be updated with the features, e.g., the structure, of the production database. In some embodiments, the system extracts a schema of the development database and the associated production database, compares the schema, and determines a drift score, which is a measure of the difference between the development database and the associated production database. The drift score is then compared to a predetermined threshold to determine whether the development database should be updated.

In a first aspect, an apparatus for updating a development database is provided, wherein the apparatus compares a development database and an associated production database to determine a drift score, whereby the development database is updated when the drift score exceeds a predetermined threshold. In some embodiments, the apparatus includes a memory; a computing processor; and a module stored in the memory, said module comprising instruction code executable by one or more computing processors, and configured to cause the one or more computing processors to: identify a development database and an associated production database, wherein the development database is a test environment for the associated production database; extract a schema of the development database and a schema of the associated production database; compare the schema of the development database and the schema of the associated production database; determine differences between the development database and the associated production database based on the comparison; determine a drift score, wherein the drift score is a measure of the difference between the development database and the associated production database; determine when the drift score exceeds a predetermined threshold, whereby the predetermined threshold is set such that exceeding the threshold indicates a level of difference between the development database and the associated production database that would result in an error in a program tested in the development database but run in the associated production database; and trigger an update between the development database and the associated production database when the drift score exceeds the predetermined threshold.

In some embodiments, the drift score is determined based on an algorithm that weights differences based upon their effect on the likelihood that the application will result in an error. In further embodiments, the predetermined threshold is determined based upon historical records of application performance in production database in association with corresponding historical drift scores between the development database and the associated production database. In an embodiment, the differences between the development database and the associated production database are selected from the group consisting of structural differences, content differences, and communication channel differences. In further embodiments, the drift score is based on an index of similarity. In further embodiments, the schema are described in a formal language supported by a database management system and refer to organization of data as a blueprint of how a database is constructed. In some embodiments, the module further comprises instruction code executable by one or more computing processors, and configured to cause the one or more computing processors to: implement an application in the production database when the drift score does not exceed the predetermined threshold.

In a second aspect, a computer program product for updating a development database is provided, wherein the computer program product compares a development database and an associated production database to determine a drift score, whereby the development database is updated when the drift score exceeds a predetermined threshold. In some embodiments, the computer program product includes a non-transitory computer-readable medium comprising: an executable portion for causing a computer to identify a development database and an associated production database, wherein the development database is a test environment for the associated production database; an executable portion for causing a computer to extract a schema of the development database and a schema of the associated production database; an executable portion for causing a computer to compare the schema of the development database and the schema of the associated production database; an executable portion for causing a computer to determine differences between the development database and the associated production database based on the comparison; an executable portion for causing a computer to determine a drift score, wherein the drift score is a measure of the difference between the development database and the associated production database; an executable portion for causing a computer to determine when the drift score exceeds a predetermined threshold, whereby the predetermined threshold is set such that exceeding the threshold indicates a level of difference between the development database and the associated production database that would result in an error in a program tested in the development database but run in the associated production database; and an executable portion for causing a computer to trigger an update between the development database and the associated production database when the drift score exceeds the predetermined threshold.

In a third aspect, a computer-implemented method for updating a development database is provided, wherein the method compares a development database and an associated production database to determine a drift score, whereby the development database is updated when the drift score exceeds a predetermined threshold. In some embodiments, the method includes identifying a development database and an associated production database, wherein the development database is a test environment for the associated production database; extracting a schema of the development database and a schema of the associated production database; comparing the schema of the development database and the schema of the associated production database; determining differences between the development database and the associated production database based on the comparison; determining a drift score, wherein the drift score is a measure of the difference between the development database and the associated production database; determining when the drift score exceeds a predetermined threshold, whereby the predetermined threshold is set such that exceeding the threshold indicates a level of difference between the development database and the associated production database that would result in an error in a program tested in the development database but run in the associated production database; and triggering an update between the development database and the associated production database when the drift score exceeds the predetermined threshold.

Other aspects and features, as recited by the claims, will become apparent to those skilled in the art upon review of the following non-limited detailed description of the disclosure in conjunction with the accompanying figures.

BRIEF DESCRIPTION OF THE SEVERAL VIEWS OF THE DRAWINGS

Having thus described embodiments in general terms, reference will now be made to the accompanying drawings, which are not necessarily drawn to scale, and wherein:

DETAILED DESCRIPTION

Embodiments will now be described more fully hereinafter with reference to the accompanying drawings, in which some, but not all, embodiments are shown. Indeed, the disclosure may be embodied in many different forms and should not be construed as limited to the embodiments set forth herein; rather, these embodiments are provided so that this disclosure may satisfy applicable legal requirements. Like numbers refer to like elements throughout.

Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." It should also be understood that while some embodiments describe the methods or products as comprising one or more elements, the methods or elements may also consist of or consist essentially of the elements disclosed herein.

It should be understood that terms like "bank," "financial institution," and "institution" are used herein in their broadest sense. Institutions, organizations, or even individuals that process financial transactions are widely varied in their organization and structure. Terms like "financial institution" are intended to encompass all such possibilities, including but not limited to banks, finance companies, stock brokerages, credit unions, savings and loans, mortgage companies, insurance companies, and/or the like. Additionally, disclosed embodiments may suggest or illustrate the use of agencies or contractors external to the financial institution to perform some of the calculations, data delivery services, and/or authentication services. These illustrations are examples only, and an institution or business can implement the entire method and system on their own computer systems or even a single work station if appropriate databases are present and can be accessed.

Figure 1:
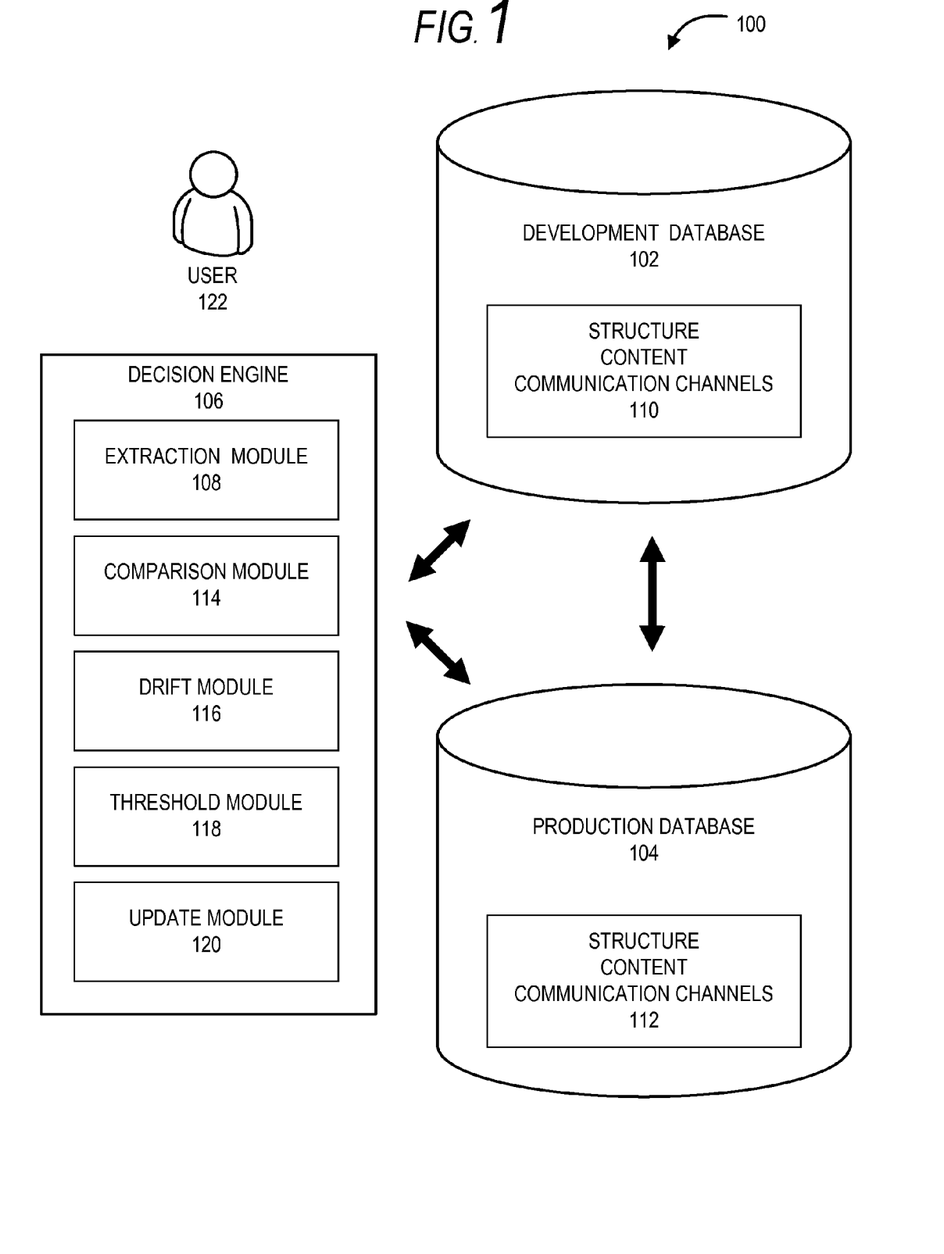
FIG. 1 provides an development database update environment wherein a development database is compared to an associated production database in order to determine a drift score and compare the drift score to a predetermined threshold, in accordance with one embodiment of the present disclosure.

FIG. 1 illustrates an environment 100 in which a development database 102 is compared to an associated production database 104 by a decision engine 106, e.g., a computing device processor programmed to carry out steps to update the development database as disclosed herein. In some embodiments, the decision engine 106 extracts schema from the development database 102 and the associated production database 104 using an extraction module 108. In an embodiment, the schema include details on the structure, content, and/or communication channels 110, 112 associated with the development database 102 and the associated production database 104.

In an embodiment, the decision engine 106 also includes a comparison module 114 that is configured to compare the schema from the development database 102 and the associated production database 104. The comparison module 114 may compare the schema in order to identify differences between the databases, such as differences that have accumulated in the databases since the last time the development database 102 was updated.

In some embodiments, the decision engine 106 includes a drift module 116 that is configured to determine a drift score based on the comparison of the schema. The drift score is a measure of the difference between the development database 102 and the associated production database 104. In some embodiments, the drift module 116 determines the drift score based on an algorithm that weights differences between the databases according to the likelihood that the difference would cause an application to encounter problems when being implemented in the production database.

In further embodiments, the decision engine 106 includes a threshold module that determines a threshold value of the drift score and the compares the determined value to the threshold value. In some embodiments, the threshold value is determined based on the likelihood that exceeding the value will result in the application encountering issues if the application were implemented in the production database.

In some embodiments, the decision engine 106 also includes an update module 120 that causes the development database 102 to be updated based on the associated production database 104 or its schema when the drift score exceeds the predetermined threshold value. In an embodiment, the system also informs a user 122 that the development database should be or has been updated.

Additional embodiments will now be described in further detail in order to provide additional concepts and examples related to how development databases may be updated in accordance with additional embodiments of the disclosure. One skilled in the art would understand that while this specification provides an example of comparison between a development database and a production database, any two or more databases that are compared and determined whether a synchronization should be performed may be used. For example, databases that should be identical but are stored in different locations or on different servers may have a system that implements the disclosed process in order to confirm that the databases are identical or have an acceptable level (i.e., below a predetermined threshold) of difference.

Figure 2:
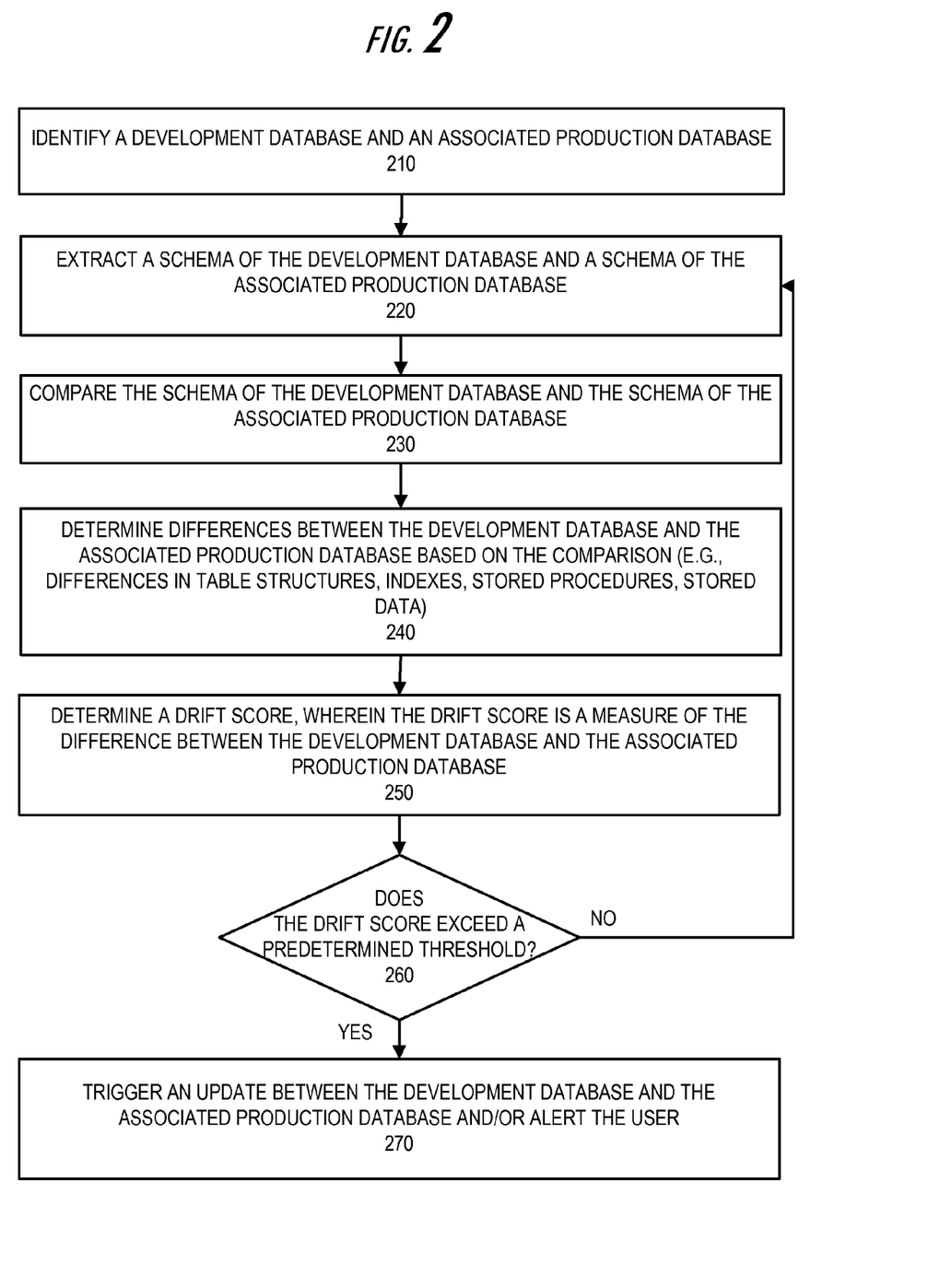
FIG. 2 provides a development database update process in which schema from a development database and an associated production database are extracted from the databases and compared in order to determine whether the development database should be updated, in accordance with one embodiment of the present disclosure.

Turning now to FIG. 2, a system and method are disclosed for updating a development database. In an embodiment, the system and/or method compares a development database and the associated production database to determine a drift score and updates the development database when the drift score exceeds a predetermined threshold. In some embodiments, the system and method updates the development database by identifying a development database and an associated production database, wherein the development database is a test environment for the associated production database; extracting a schema of the development database and a schema of the associated production database; comparing the schema of the development database and the schema of the associated production database; determining differences between the development database and the associated production database based on the comparison; determining a drift score, wherein the drift score is a measure of the difference between the development database and the associated production database; determining when the drift score exceeds a predetermined threshold, whereby the predetermined threshold is set such that exceeding the threshold indicates a level of difference between the development database and the associated production database that would result in an error in a program tested in the development database but run in the associated production database; and triggering an update between the development database and the associated production database when the drift score exceeds the predetermined threshold.

In block 210, the system identifies a development database and an associated production database. In some embodiments, the development database is a test environment for the associated production database. A development database is a location for programmers and application developers to test code and applications on test data before implementing the code on data that is in use by the institution. For example, an application developer may test a marketing application that selects customers for an offer based on a variety of criteria associated with the customer. The application developer may first test the marketing application on a development database that mirrors the production database in order to identify errors or code that causes an error when run. Testing the marketing database on the production database may result in errors in the production database, use up resources unnecessarily, or alter the underlying data in the production database. In some embodiments, the development database mirrors the production database based on at least the structure of the databases, the communication of the databases, the queries in the databases, the data in the databases, and the like.

In an embodiment, the associated production database is the database that is in use by the financial institution for a purpose other than testing code and applications. For example, the production database may be a database related to business customers of the financial institution having a specific type of account (e.g., a small business loan). The production database is associated with the development database based on the relationship between the production database and the development database. A development database that is updated with the current structure and/or other elements of a production database is associated with the production database.

In some embodiments, the development database is a test environment for the associated production database. In an embodiment, applications are run in the test environment prior to being implemented in the production database. The test environment allows a user to confirm that the code or application will run correctly in the production environment when the code or application is implemented.

In an embodiment, the system identifies the development database and/or the associated production database based on a user request. For example, a user may input an identifier for a production database and the system identifies the production database from the identifier. The development database may be connected to, such as via a network, the production database in order to facilitate updating of the development and/or production databases. In another embodiment, the system identifies the development database and/or the production database based on the code or application that is being tested. For example, an application developer may indicate that a specific new version of an application is going to be tested. The application developer wants to know whether the development database should be updated. The system identifies the application that is going to be tested in a test environment, searches a plurality of databases to identify the database or databases that the application is running in, and identifies the development database and associated production databases based on the location of the current applications.

In block 220, the system extracts a schema of the development database and a schema of the associated production database. In an embodiment, a schema is a structure of a database system. In an embodiment, the schema is described in a formal language supported by the database management system and refers to the organization of data as a blueprint of how a database is constructed. In some embodiments, the database is divided into database tables, such as in relational databases. The schema may comprise a set of formulas or integrity constraints imposed on the database. The schema permits the structure and relationships of the databases to be defined in formal language and therefore compared to one another.

In an embodiment, the schema is extracted using a computing device processor that scans or evaluates the database and converts the database structure into the formal depiction of the structure, i.e., the schema. For example, the system may open the database and read the tables and rows associated with the database. In an embodiment, the system compares the database to an earlier schema for the database in order to identify changes to the database and then modifies the new schema accordingly. In some embodiments, a new schema is prepared each time the schema is extracted without reference to earlier schema or versions of the database.

In some embodiments, the schema is extracted upon request by a user. In further embodiments, the schema is extracted on a regular or irregular schedule, such as every 24 hours. In some embodiments, the schema is extracted when a database, such as a development database is opened. For example, the system may automatically extract the schema of the development database and the associated production database when the development database is accessed. In another embodiment, the schema is extracted upon occurrence of an event detected by the system. For example, the schema for the development database and the associated production database may be extracted when the system identifies a change to the production database or the development database, such as a change in structure or content.

In block 230, the system compares the schema of the development database and the schema of the associated production database. In an embodiment, the schema is compared to identify differences between the development database and the associated production database. The comparison may be performed by a computing device processor in order to identify specific differences between the development database and the associated production database. In some embodiment, the comparison is performed in order to identify general differences between the development database and the associated production database. For example, the system may identify generally that the number of columns has changed or the system may identify specifically that the number of columns has increased from five columns to seven columns.

In an embodiment, the comparison evaluates the structure, content, and/or communication channels between the development database and the associated production database. For example, the structure of the database may include the layout of tables or other structures making a part of the database, the queries associated with the database, the format and/or data types associated with data or locations in the database (e.g., data in column X is floating point integer format, data in column Y is in text format, and the like), and other structural features of the database.

The content of the database may also be evaluated. For example, constants or unchanging values input into a database may be compared in order to determine that the constant was not inadvertently changed. Test data present in the database may also be evaluated. Stored procedures in the databases may also be evaluated as a part of the structure or content of the database. Indexes associated with the databases may also be considered.

Further, the system may evaluate communication channels between the database and external sources of data in order to confirm that inputs to the database will be consistent between the development database and the associated production database. For example, the production database may receive data from an external source, such as customer input devices or databases that aggregate customer input. The received data may change the content of the database. In some embodiments, the comparison evaluates the communication channels to determine whether the data that are being input into the production database are similar or identical to the communication channels connected to the development database.

In block 240, the system determines differences between the development database and the associated production database based on the comparison. In some embodiments, the system determines, using a computing device processor, changes between the development database and the associated production database in a qualitative manner. For example, addition of a column to the production database that is not present in the development database may result in a qualitative difference between the databases, i.e., a change in the structure. In some embodiments, the system determines, using a computing device processor, changes between the development database and the associated production database in a quantitative manner. For example, the number of addition rows added to the production database may be determined, wherein each row corresponds to a new customer.

In block 250, the system determines a drift score, wherein the drift score is a measure of the difference between the development database and the associated production database. In an embodiment, a drift score is a metric of how divergent the development database is from the associated production database based on the differences. In some embodiments, the drift score is scaled to a specific range, such as between 0 and 1 or 0 and 100. In an embodiment, a drift score of zero indicates that the schema of the development database and the schema of the associated production database are identical. As the schemas differ from each other as differences are introduced between the development database and the associated production database, the drift score will increase. In this manner, the databases "drift" away from one another based on accumulating differences.

In some embodiments, the drift score is determined based on an algorithm that weights various portions and or differences of the databases. For example, an additional row in a production database, representing an additional customer, may have a small weight for determining the drift score because additional customers in a database are unlikely to cause errors when implementing an application or code. In contrast, an additional column in a table may have a higher weight and influence on the drift score because adding columns may make program code unstable. Similarly, moving columns or changing format of cells in the databases may have even higher weights due to the likelihood that such changes will destabilize an application. If the application is developed in the development database having cells of a first format and the application is then run in a production database having cells of a second format, the application may run into errors when attempting to read data from the cells in the production database.

In some embodiments, the drift score is based on a similarity score between the development database and the associated production database. Algorithms for determining similarity scores for collections of data are known, e.g., distance methods, Jaccards index, Sorenson-Dice coefficient, and the like. Other measures of similarity or difference may also be used, including proprietary measurements developed by the provider of the system. Using the comparison of the development database and the associated production database, along with the identified differences, the drift score is determined using a computing device processor.

In decision block 260, the system determines whether the drift score exceeds a predetermined threshold. In an embodiment, the predetermined threshold is the level at which the system determines the development database should be updated with the structure, content, and/or communication channels of the production database.

In an embodiment, the predetermined threshold is set by a user, for example, an application developer. The user may enter a specific level for the predetermined threshold. The specific level may be a default level or one of a list of default levels. In some embodiments, the level directly relates to the level of difference between the development database and the associated production database. For example, the user may enter a predetermined threshold of 0.1, which may correspond to a 10% difference. In some embodiments, due to weighting in the algorithm, the predetermined threshold does not correspond directly to the level of difference between the databases. For example, a single change may be heavily weighted and therefore the drift score would be high. If the algorithm is well understood by the users, then allowing the user to set a predetermined threshold, providing a default threshold, or providing selectable threshold levels may be appropriate.

In another embodiment, the user enters a value that corresponds to an expected result if the threshold is met. For example, the user may request the threshold be set such that the application has a 99%, 95%, 90%, or the like, chance of successfully running in the production database. When the user enters the desired level for chance of successfully implementing the program, the system calculates the predetermined threshold based on that desired level. In an embodiment, the system tracks implementation of applications and drift scores between development database and associated production databases to determine how likely an application is to be successfully implemented at various predetermined thresholds and drift scores. This data may be stored in a database and accessible to the system.

If the drift score does not exceed the predetermined threshold, the system continues to monitor the development database and the associated production database. In an embodiment, the system monitors the development database and the associated production database regularly in order to conduct updates as needed.

If the drift score exceeds the predetermined threshold, the system triggers an update between the development database and the associated production database and/or alerts the user to the drift score, as shown in block 270. When the drift score exceeds the predetermined threshold, the level of difference between the development database and the associated production database is above the desired level. In this situation, the system triggers the update. The update may occur automatically or the system may alert a user, such as a systems or database administrator, to update the development database. Synchronization is synonymous with update here and refers to the process by which the development database and associated production database are compared to one another and updates made to make the databases similar or identical to one another.

In an embodiment, when the update is triggered the development database is automatically updated based on the schema of the production database. In a first embodiment, the update makes the development database identical to the production database. In a second embodiment, the update changes the development database so that the drift score based on the development database and the associated production database is below an acceptable level. For example, minor differences between the development database and the associated production database may be acceptable and in some cases inevitable. These minor differences may result in a small but acceptable drift score. When the update occurs, these minor differences may be retained and thus the drift score will not be zero but the update will be successful.

Advantageously, the system permits a user such as an application developer to have greater confidence in the test environment because the associated production database is likely to be similar. Previously, application developers may develop an application in the development database but run into problems when implementing the application in the production database because of differences between the development database and the associated production database. With the system disclosed herein, the application developer can have greater confidence that the development database and the production database are similar enough that applications prepared in the development database will be implemented correctly in the production database. This saves both time and money when developing applications.

Figure 3:
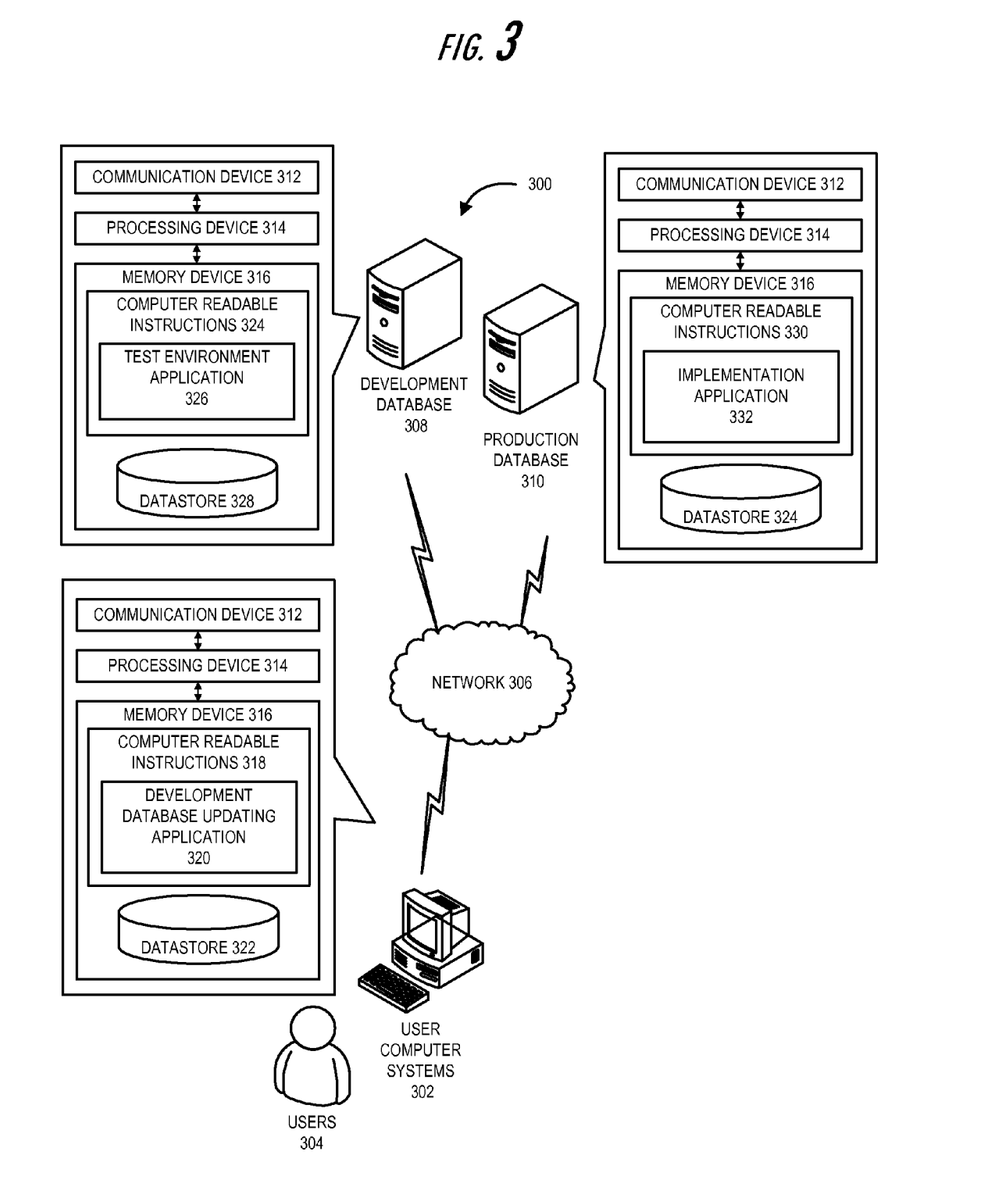
FIG. 3 provides illustrates a block diagram for a development database update environment and system, in accordance with one embodiment of the present disclosure.

FIG. 3 illustrates a system 300 for updating a development database, in accordance with an embodiment of the present disclosure. As illustrated in FIG. 3, the computer systems 302 of users 304 are operatively coupled, via a network 306, to the development database 308 and the production database 310. In this way, the users 304 may utilize the user computer systems 302 to test applications in the development database 308, implemented the applications in the production database 310, and update the development database 302 via the system. FIG. 3 illustrates only one example of embodiments of a development database update system 300, and it will be appreciated that in other embodiments one or more of the systems (e.g., computers, mobile devices, servers, or other like systems) may be combined into a single system or be made up of multiple systems.

The network 306 may be a global area network (GAN), such as the Internet, a wide area network (WAN), a local area network (LAN), or any other type of network or combination of networks. The network 306 may provide for wireline, wireless, or a combination of wireline and wireless communication between devices on the network.

As illustrated in FIG. 3, the user computer systems 302 generally comprise a communication device 312, a processing device 314, and a memory device 316. As used herein, the term "processing device" generally includes circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 314 is operatively coupled to the communication device 312 and the memory device 316. The processing device 314 uses the communication device 312 to communicate with the network 306 and other devices on the network 306, such as, but not limited to, the development database 308 and the production database 310. As such, the communication device 312 generally comprises a modem, server, or other device for communicating with other devices on the network 306, and a display, camera, keypad, mouse, keyboard, microphone, and/or speakers for communicating with one or more users 304. The user computer systems 302 may include, for example, a personal device, which may be a personal computer, a laptop, a mobile device (e.g., phone, smartphone, tablet, or personal display device ("PDA"), or the like) or other like devices whether or not the devices are mentioned within this specification. In some embodiments, the user computer systems 302 could include a data capture device that is operatively coupled to the communication device 312, processing device 314, and the memory device 316. The data capture device could include devices such as, but not limited to a location determining device, such as a radio frequency identification ("RFID") device, a global positioning satellite ("GPS") device, Wi-Fi triangulation device, or the like, which can be used by a user 304, institution, or the like to capture information from a user 304, such as but not limited to the location of the user 304.

As further illustrated in FIG. 3, the user computer systems 302 comprises computer-readable instructions 318 stored in the memory device 316, which in one embodiment includes the computer-readable instructions 318 of a development database updating application 320 (e.g., an application that compare the development database to the production database and updates the development database). In some embodiments, the memory device 316 includes a datastore 322 for storing data related to the user computer system 302, including but not limited to data created and/or used by development database updating application 320.

As further illustrated in FIG. 3, the development database 308 generally includes a communication device 312, a processing device 314, and a memory device 316. The processing device 314 is operatively coupled to the communication device 312 and the memory device 316. The processing device 314 uses the communication device 312 to communicate with the network 306 and other devices on the network 306. As such, the communication device 312 generally comprises a modem, server, or other device(s) for communicating with other devices on the network 306.

As illustrated in FIG. 3, the development database 308 includes computer-readable program instructions 324 stored in the memory device 316, which in one embodiment includes the computer-readable instructions 324 of a test environment application 326. In some embodiments, the memory device 316 includes a datastore 328 for storing data related to the development database 308, including but not limited to data created and/or used by the test environment application 326. The test environment application 326 provides an environment in which applications can be tested in the development database 308 without affecting customer data.

As further illustrated in FIG. 3, the production database 310 generally includes a communication device 312, a processing device 314, and a memory device 316. The processing device 314 is operatively coupled to the communication device 312 and the memory device 316.

As illustrated in FIG. 3, the production database 310 includes computer-readable program instructions 330 stored in the memory device 316, which in one embodiment includes the computer-readable instructions 330 of an implementation application 332. In some embodiments, the memory device 316 includes a datastore 324 for storing data related to the implementation of the application, including but not limited to data created and/or used by the implementation application 322. The implementation application 322 tracks implementation of the application after it is installed in the production database and, in some embodiments, provides feedback on the actual operations for use in improving or developing algorithms for setting drift score thresholds.

It is understood that the servers, systems, and devices described herein illustrate one embodiment. It is further understood that one or more of the servers, systems, and devices can be combined in other embodiments and still function in the same or similar way as the embodiments described herein.

As will be appreciated by one of skill in the art, the present disclosure may be embodied as a method (including, for example, a computer-implemented process, a business process, and/or any other process), apparatus (including, for example, a system, machine, device, computer program product, and/or the like), or a combination of the foregoing. Accordingly, embodiments of the present disclosure may take the form of an entirely hardware embodiment, an entirely software embodiment (including firmware, resident software, micro-code, etc.), or an embodiment combining software and hardware aspects that may generally be referred to herein as a "system." For example, various embodiments may take the form of web-implemented computer software. Furthermore, embodiments of the present disclosure may take the form of a computer program product on a computer-readable medium having computer-executable program code embodied in the medium.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present disclosure, however, the computer-readable medium may be transitory, such as, for example, a propagation signal including computer-executable program code portions embodied therein.

One or more computer-executable program code portions for carrying out operations of the present disclosure may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present disclosure are written in conventional procedural programming languages, such as the "C" programming languages and/or similar programming languages. The computer program code may alternatively or additionally be written in one or more multi-paradigm programming languages, such as, for example, F#.

Some embodiments of the present disclosure are described herein with reference to flowchart illustrations and/or block diagrams of apparatuses and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present disclosure.

As used herein, a processor/computer, which may include one or more processors/computers, may be "configured to" perform a stated function in a variety of ways, including, for example, by having one or more general-purpose circuits perform the stated function by executing one or more computer-executable program code portions embodied in a computer-readable medium, and/or by having one or more application-specific circuits perform the stated function.

While certain exemplary embodiments have been described and shown in the accompanying drawings, it is to be understood that such embodiments are merely illustrative of, and not restrictive on, the broad disclosure, and that this disclosure not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments may be configured without departing from the scope and spirit of the disclosure. Therefore, it is to be understood that, within the scope of the appended claims, the disclosure may be practiced other than as specifically described herein.

What is claimed is:

1. An apparatus for updating a development database, wherein the apparatus compares the development database and an associated production database to determine a drift score, whereby the development database is updated when the drift score exceeds a predetermined threshold, the apparatus comprising:

a memory;
a computing processor; and
a module stored in the memory, said module comprising instruction code executable by one or more computing processors, and configured to cause the one or more computing processors to:
identify a development database and an associated production database, wherein the development database is a test environment for the associated production database;
extract a schema of the development database comprising a structure, content, and communication channels of the development database;
extract a schema of the associated production database comprising a structure, content, and communication channels of the associated production database;
compare, using a decision engine, the schema of the development database and the schema of the associated production database;
determine differences between the schema of the development database and the schema of the associated production database based on the comparison, the differences comprising:
structural differences between a layout of tables in the development database and a layout of tables in the associated production database;
structural differences between a format of data in the development database and a format of data in the associated production database;
structural differences between stored data types in the development database and stored data types in the associated production database;
structural differences between locations of portions of the stored data types in the development database and locations of portions of the stored data types in the associated production database;
content differences between constants or unchanging values stored in the development database and constants or unchanging values stored in the associated production database;
communication channel differences between external sources of data of the development database and external sources of data of the associated production database; and
communication channel differences between input data types of the development database and input data types of the associated production database;
determine a drift score, wherein the drift score is a measure of the differences between the schema of the development database and the schema of the associated production database, wherein the drift score is calculated based on an algorithm that weights the differences based upon their effect on a likelihood that an application will result in an error;
determine whether the drift score exceeds a predetermined threshold, whereby the predetermined threshold is set such that exceeding the threshold indicates a level of difference between the development database and the associated production database that would result in an error in a program tested in the development database but run in the associated production database; and
(i) trigger an update between the development database and the associated production database when the drift score exceeds the predetermined threshold, or (ii) implement the application in the associated production database when the drift score does not exceed the predetermined threshold.

2. The apparatus of claim 1, wherein the predetermined threshold is determined based upon historical records of application performance in the associated production database in association with corresponding historical drift scores between the development database and the associated production database.

3. The apparatus of claim 1, wherein the drift score is based on an index of similarity.

4. The apparatus of claim 1, wherein the schema are described in a formal language supported by a database management system and refer to organization of data as a blueprint of how a database is constructed.

5. The apparatus of claim 1, wherein the update further comprises an automatic update to the development database to cause the structure, content, and communication channels of the development database to be identical to the structure, content, and communication channels of the associated production database.

6. The apparatus of claim 1, wherein the update further comprises an automatic change to the development database to reduce the drift score to a value below the predetermined threshold.

7. A computer program product for updating a development database, wherein the computer program product compares the development database and an associated production database to determine a drift score, whereby the development database is updated when the drift score exceeds a predetermined threshold, the computer program product comprising:

a non-transitory computer-readable medium comprising:
an executable portion for causing a computer to identify a development database and an associated production database, wherein the development database is a test environment for the associated production database;
an executable portion for causing a computer to extract a schema of the development database comprising a structure, content, and communication channels of the development database;
an executable portion for causing a computer to extract a schema of the associated production database comprising a structure, content, and communication channels of the associated production database;
an executable portion for causing a computer to compare, using a decision engine, the schema of the development database and the schema of the associated production database;
an executable portion for causing a computer to determine differences between the schema of the development database and the schema of the associated production database based on the comparison, the differences comprising:
structural differences between a layout of tables in the development database and a layout of tables in the associated production database;
structural differences between a format of data in the development database and a format of data in the associated production database;
structural differences between stored data types in the development database and stored data types in the associated production database;
structural differences between locations of portions of the stored data types in the development database and locations of portions of the stored data types in the associated production database;
content differences between constants or unchanging values stored in the development database and constants or unchanging values stored in the associated production database;
communication channel differences between external sources of data of the development database and external sources of data of the associated production database; and
communication channel differences between input data types of the development database and input data types of the associated production database;
an executable portion for causing a computer to determine a drift score, wherein the drift score is a measure of the differences between the schema of the development database and the schema of the associated production database wherein the drift score is calculated based on an algorithm that weights differences based upon their effect on a likelihood that an application will result in an error;
an executable portion for causing a computer to determine whether the drift score exceeds a predetermined threshold, whereby the predetermined threshold is set such that exceeding the threshold indicates a level of difference between the development database and the associated production database that would result in an error in a program tested in the development database but run in the associated production database; and
an executable portion for causing a computer to (i) trigger an update between the development database and the associated production database when the drift score exceeds the predetermined threshold, or (ii) implement the application in the associated production database when the drift score does not exceed the predetermined threshold.

8. The computer program product according to claim 7, wherein the predetermined threshold is determined based upon historical records of application performance in the associated production database in association with corresponding historical drift scores between the development database and the associated production database.

9. The computer program product according to claim 7, wherein the drift score is based on an index of similarity.

10. The computer-program product according to claim 7, wherein the schema are described in a formal language supported by a database management system and refer to organization of data as a blueprint of how a database is constructed.

11. The computer program product according to claim 7, wherein the update further comprises an automatic update to the development database to cause the structure, content, and communication channels of the development database to be identical to the structure, content, and communication channels of the associated production database.

12. The computer program product according to claim 7, wherein the update further comprises an automatic change to the development database to reduce the drift score to a value below the predetermined threshold.

13. A computer-implemented method for updating a development database, wherein the method compares the development database and an associated production database to determine a drift score, whereby the development database is updated when the drift score exceeds a predetermined threshold, the method comprising:

identifying a development database and an associated production database, wherein the development database is a test environment for the associated production database;

extracting a schema of the development database comprising a structure, content, and communication channels of the development database;

extracting a schema of the associated production database comprising a structure, content, and communication channels of the development database;

comparing, using a decision engine, the schema of the development database and the schema of the associated production database; wherein the schema comprises at least the structure, content, and/or communication channels of the database;

determining differences between the schema of the development database and the schema of the associated production database based on the comparison, the differences comprising:

structural differences between a layout of tables in the development database and a layout of tables in the associated production database;

structural differences between a format of data in the development database and a format of data in the associated production database;

structural differences between stored data types in the development database and stored data types in the associated production database;

structural differences between locations of portions of the stored data types in the development database and locations of portions of the stored data types in the associated production database;

content differences between constants or unchanging values stored in the development database and constants or unchanging values stored in the associated production database;

communication channel differences between external sources of data of the development database and external sources of data of the associated production database; and     communication channel differences between input data types of the development database and input data types of the associated production database;

determining a drift score, wherein the drift score is a measure of the differences between the schema of the development database and the schema of the associated production database wherein the drift score is determined based on an algorithm that weights differences based upon their effect on a likelihood that an application will result in an error;

determining whether the drift score exceeds a predetermined threshold, whereby the predetermined threshold is set such that exceeding the threshold indicates a level of difference between the development database and the associated production database that would result in an error in a program tested in the development database but run in the associated production database; and (i) triggering an update between the development database and the associated production database when the drift score exceeds the predetermined threshold, or (ii) implementing the application in the associated production database when the drift score does not exceed the predetermined threshold.

14. The computer-implemented method of claim 13, wherein the predetermined threshold is determined based upon historical records of application performance in the associated production database in association with corresponding historical drift scores between the development database and the associated production database.

15. The computer-implemented method of claim 13, wherein the schema are described in a formal language supported by a database management system and refer to organization of data as a blueprint of how a database is constructed.

16. The computer-implemented method of claim 13, wherein the update further comprises an automatic update to the development database to cause the structure, content, and communication channels of the development database to be identical to the structure, content, and communication channels of the associated production database.

17. The computer-implemented method of claim 13, wherein the update further comprises an automatic change to the development database to reduce the drift score to a value below the predetermined threshold.

* * * * *